(12) United States Patent
Molesini et al.

(10) Patent No.: US 11,920,491 B2
(45) Date of Patent: Mar. 5, 2024

(54) TURBOMACHINES AND EPICYCLIC GEAR ASSEMBLIES WITH LUBRICATION CHANNELS

(71) Applicant: GE Avio S.r.l., Turin (IT)

(72) Inventors: Pietro Molesini, Turin (IT); Fabio De Bellis, Turin (IT); Andrea Piazza, Turin (IT)

(73) Assignee: GE Avio S.r.l. (IT)

( * ) Notice: Subject to any disclaimer, the term of this patent is extended or adjusted under 35 U.S.C. 154(b) by 0 days.

(21) Appl. No.: 17/835,879

(22) Filed: Jun. 8, 2022

(65) Prior Publication Data

US 2022/0397040 A1   Dec. 15, 2022

(30) Foreign Application Priority Data

Jun. 11, 2021   (IT) .................. 102021000015386

(51) Int. Cl.
| | | |
|---|---|---|
| *F01D 25/18* | (2006.01) | |
| *F16H 1/28* | (2006.01) | |
| *F16H 57/04* | (2010.01) | |

(52) U.S. Cl.
CPC .............. *F01D 25/18* (2013.01); *F16H 1/28* (2013.01); *F16H 57/0423* (2013.01); *F16H 57/0427* (2013.01); *F16H 57/043* (2013.01); *F16H 57/046* (2013.01); *F16H 57/0486* (2013.01); *F05D 2220/36* (2013.01); *F05D 2260/40311* (2013.01); *F05D 2260/98* (2013.01)

(58) Field of Classification Search
CPC ............. F02C 7/36; F05D 2260/40311; F05D 2260/98; F05D 2220/323; F05D 2220/36; F16H 57/04; F16H 57/08; F16H 57/0471; F16H 57/043; F16H 57/0467; F16H 57/0423; F16H 57/0427; F16H 57/046; F16H 57/0486; F01D 15/12; F16C 2361/65

See application file for complete search history.

(56) References Cited

U.S. PATENT DOCUMENTS

| | | |
|---|---|---|
| 5,107,676 A | 4/1992 | Hadaway et al. |
| 6,223,616 B1 | 5/2001 | Sheridan |
| | (Continued) | |

FOREIGN PATENT DOCUMENTS

| | | |
|---|---|---|
| EP | 2 554 874 A2 | 2/2013 |
| EP | 3 054 139 A1 | 8/2016 |
| | (Continued) | |

OTHER PUBLICATIONS

McKinzie, Kyule et al., "Composite Shaft with core insert", Sep. 3, 2015, DE 102015202443-A1 (Year: 2015).*

(Continued)

*Primary Examiner* — Woody A Lee, Jr.
*Assistant Examiner* — Joshua R Beebe
(74) *Attorney, Agent, or Firm* — Klarquist Sparkman, LLP

(57) ABSTRACT

A gear assembly for use with a turbomachine comprises a sun gear, a plurality of planet gear layshafts that each support a first stage planet gear and a second stage planet gear, and a ring gear. The sun gear is configured to rotate about a longitudinal centerline of the gear assembly, and the plurality of planet gear layshafts comprise an interior passage that receives one or more lubrication supply lines.

19 Claims, 13 Drawing Sheets

(56) References Cited

U.S. PATENT DOCUMENTS

| | | | |
|---|---|---|---|
| 8,381,878 B2 | 2/2013 | DiBenedetto | |
| 8,920,283 B2 | 12/2014 | Richards | |
| 8,939,714 B1* | 1/2015 | McCune | F02C 7/36 |
| | | | 415/122.1 |
| 9,038,779 B2 | 5/2015 | McCune et al. | |
| 9,404,381 B2 | 8/2016 | NguyenLoc et al. | |
| 9,404,420 B2* | 8/2016 | Gallet | F01D 25/18 |
| 9,523,424 B2* | 12/2016 | Altamura | F16H 57/0479 |
| 9,790,804 B2 | 10/2017 | Lepretre et al. | |
| 10,082,105 B2* | 9/2018 | McCune | F16H 57/04 |
| 10,364,881 B2 | 7/2019 | Pikovsky et al. | |
| 10,480,348 B2 | 11/2019 | Lighty et al. | |
| 11,268,453 B1* | 3/2022 | Desjardins | F16H 57/04 |
| 11,339,725 B2* | 5/2022 | Simon | F16H 1/28 |
| 2014/0250860 A1* | 9/2014 | Sidelkovskiy | F01D 15/10 |
| | | | 60/39.15 |
| 2014/0363276 A1* | 12/2014 | Vetters | F02C 7/36 |
| | | | 415/124.2 |
| 2016/0186608 A1 | 6/2016 | Cigal et al. | |
| 2019/0048802 A1* | 2/2019 | Desjardins | F02C 7/06 |
| 2019/0360356 A1* | 11/2019 | Savaria | F16H 57/082 |
| 2019/0360578 A1 | 11/2019 | Chevillot et al. | |
| 2019/0376595 A1* | 12/2019 | Meyer | F16H 57/0427 |
| 2020/0165980 A1* | 5/2020 | Di Giovanni | F16H 57/042 |
| 2020/0200042 A1* | 6/2020 | Charrier | F01D 25/18 |
| 2021/0017910 A1* | 1/2021 | Spruce | F16H 1/06 |

FOREIGN PATENT DOCUMENTS

| | | |
|---|---|---|
| EP | 2 921 672 B1 | 6/2017 |
| FR | 3 084 407 A1 | 1/2020 |
| JP | 6 356757 B2 | 7/2018 |

OTHER PUBLICATIONS

Surh, Hannes et al., "Lubricating Device for a planetary gear and method for producing a lubricating device," Jan. 5, 2017, DE 102015220723-A1 (Year: 2017).*

* cited by examiner

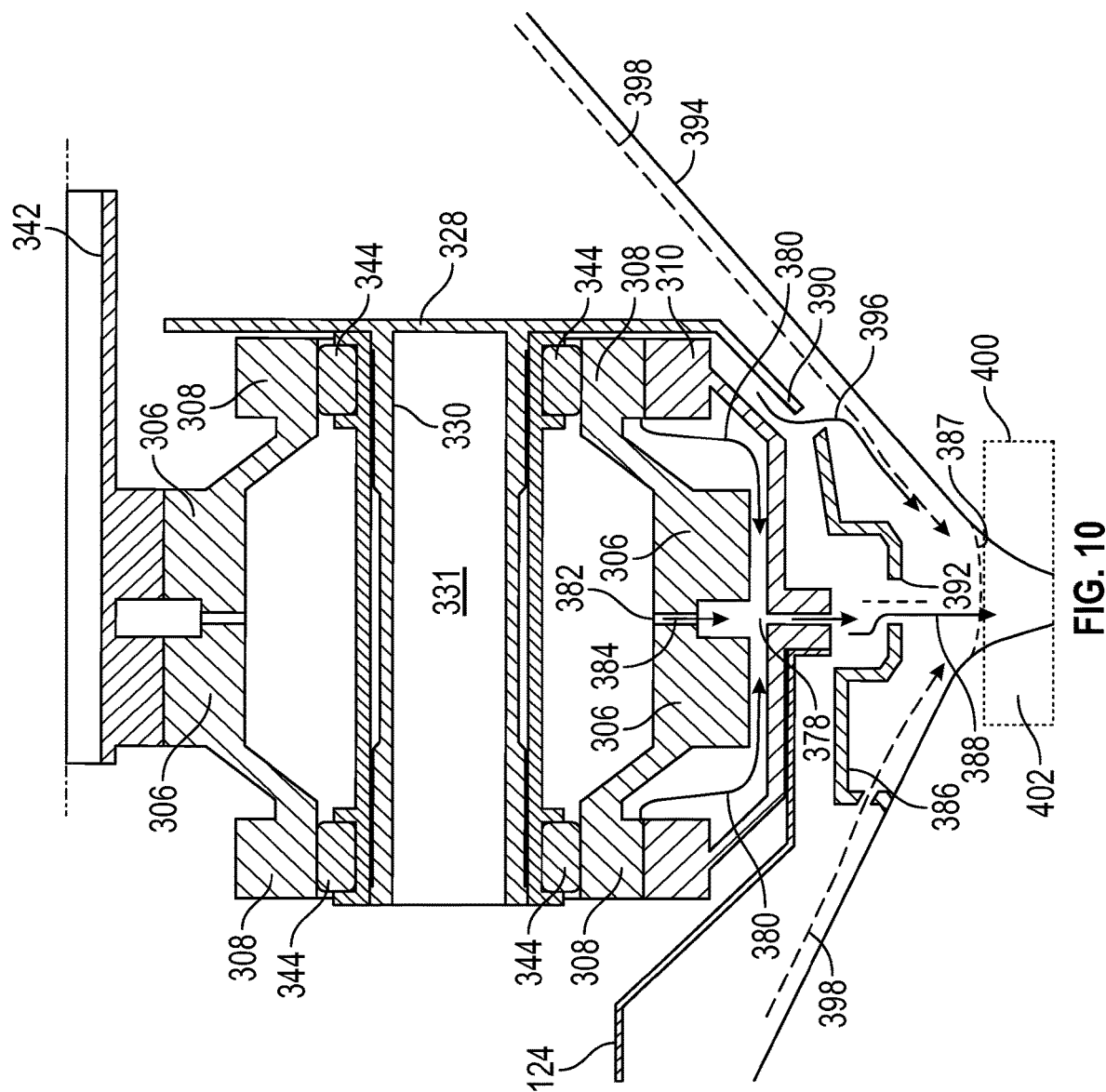

TURBOMACHINES AND EPICYCLIC GEAR ASSEMBLIES WITH LUBRICATION CHANNELS

ACKNOWLEDGMENT OF GOVERNMENT SUPPORT

The project leading to this application has received funding from the Clean Sky 2 Joint Undertaking (JU) under grant agreement No 945541. The JU receives support from the European Union's Horizon 2020 research and innovation programme and the Clean Sky 2 JU members other than the Union.

CROSS REFERENCE TO RELATED APPLICATION

This application claims the benefit of Italian Patent Application No. 102021000015386, filed Jun. 11, 2021. The prior application is incorporated herein by reference in its entirety.

FIELD

The present subject matter relates generally to turbomachines including gear assemblies and, in particular, to gear assembly arrangements particular to certain turbomachine configurations.

BACKGROUND

Gearboxes used in modern aeroengines require continuous lubrication to transmit power. Space limitations of the gear box present technical challenges relating to lubrication fluid supply and/or collection. As such, there is a need for gear assemblies that provide improved lubrication fluid distribution and/or collection systems, including improvements that can reduce the radial and/or axial footprint of the gearbox and lubrication systems and/or otherwise provide improved management of lubrication fluids within the gearbox.

SUMMARY

Aspects and advantages of the invention will be set forth in part in the following description, or may be obvious from the description, or may be learned through practice of the technology disclosed in the description.

Various turbomachine engines and gear assemblies are disclosed herein, including various lubrication feeding and/or collection systems and methods relating to gear assemblies.

For example, in one embodiment a gear assembly for use with a turbomachine engine comprises a sun gear, a plurality of planet gear layshafts that each support a first stage planet gear and a second stage planet gear, and a ring gear, the sun gear rotating about a longitudinal centerline of the gear assembly; and a lubrication system comprising a plurality of lubrication fluid supply lines. The plurality of planet gear layshafts each comprise an interior passageway that extends between an aft side of the layshaft and a fore side of the layshaft, and the plurality of lubrication fluid supply lines include one or more layshaft supply lines that extend through respective ones of the interior passageways of the planet gear layshafts.

These and other features, aspects and advantages of the present disclosure will become better understood with reference to the following description and appended claims.

The accompanying drawings, which are incorporated in and constitute a part of this specification, illustrate embodiments of the disclosed technology and, together with the description, serve to explain the principles of the disclosure.

BRIEF DESCRIPTION OF THE DRAWINGS

A full and enabling disclosure of the present invention directed to one of ordinary skill in the art, is set forth in the specification, which makes reference to the appended figures, in which:

FIG. 10 is a schematic illustration of exemplary lubrication collection system for a gearbox;

DETAILED DESCRIPTION

Figure 1:
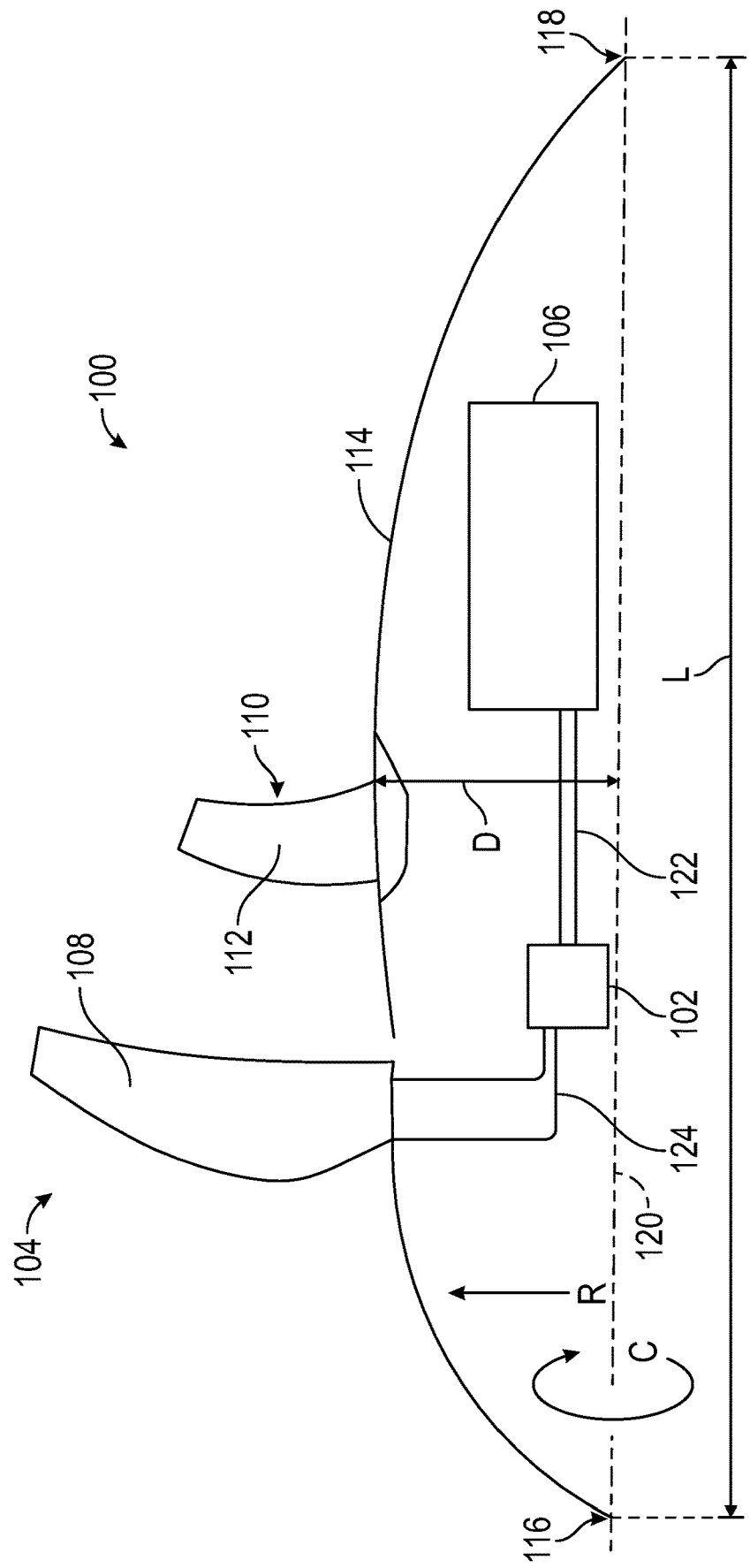
FIG. 1 is a cross-sectional schematic illustration of an exemplary embodiment of an open rotor propulsion system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 is an exemplary embodiment of an engine 100 including a gear assembly 102 according to aspects of the present disclosure. The engine 100 includes a fan assembly 104 driven by a core engine 106. In various embodiments, the core engine 106 is a Brayton cycle system configured to drive the fan assembly 104. The core engine 106 is shrouded, at least in part, by an outer casing 114. The fan assembly 104 includes a plurality of fan blades 108. A vane assembly 110 is extended from the outer casing 114. The vane assembly 110 including a plurality of vanes 112 is positioned in operable arrangement with the fan blades 108 to provide thrust, control thrust vector, abate or re-direct undesired acoustic noise, and/or otherwise desirably alter a flow of air relative to the fan blades 108. In some embodiments, the fan assembly 104 includes between three (3) and twenty (20) fan blades 108. In particular embodiments, the fan assembly 104 includes between ten (10) and sixteen (16) fan blades 108. In certain embodiments, the fan assembly 104 includes twelve (12) fan blades 108. In certain embodiments, the vane assembly 110 includes an equal or fewer quantity of vanes 112 to fan blades 108.

In some embodiments, the fan blade tip speed at a cruise flight condition can be 650 to 900 fps, or 700 to 800 fps. A fan pressure ratio (FPR) for the fan assembly 104 can be 1.04 to 1.10, or in some embodiments 1.05 to 1.08, as measured across the fan blades at a cruise flight condition.

In certain embodiments, such as depicted in FIG. 1, the vane assembly 110 is positioned downstream or aft of the fan assembly 104. However, it should be appreciated that in some embodiments, the vane assembly 110 may be positioned upstream or forward of the fan assembly 104. In still various embodiments, the engine 100 may include a first vane assembly positioned forward of the fan assembly 104 and a second vane assembly positioned aft of the fan assembly 104. The fan assembly 104 may be configured to desirably adjust pitch at one or more fan blades 108, such as to control thrust vector, abate or re-direct noise, and/or alter thrust output. The vane assembly 110 may be configured to desirably adjust pitch at one or more vanes 112, such as to control thrust vector, abate or re-direct noise, and/or alter thrust output. Pitch control mechanisms at one or both of the fan assembly 104 or the vane assembly 110 may co-operate to produce one or more desired effects described above.

The core engine 106 is generally encased in outer casing 114 defining a maximum diameter. In certain embodiments, the engine 100 includes a length from a longitudinally forward end 116 to a longitudinally aft end 118. In various embodiments, the engine 100 defines a ratio of length (L) to maximum diameter ($D_{max}$) that provides for reduced installed drag. In one embodiment, $L/D_{max}$ is at least 2. In another embodiment, $L/D_{max}$ is at least 2.5. In some embodiments, the $L/D_{max}$ is less than 5, less than 4, and less than 3. In various embodiments, it should be appreciated that the $L/D_{ina}$ is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the $L/D_{max}$, the fan assembly 104, and/or the vane assembly 110 separately or together configure, at least in part, the engine 100 to operate at a maximum cruise altitude operating speed between approximately Mach 0.55 and approximately Mach 0.85.

Referring again to FIG. 1, the core engine 106 extends in a radial direction R relative to an engine axis centerline 120. The gear assembly 102 receives power or torque from the core engine 106 through a power input source 122 and provides power or torque to drive the fan assembly 104, in a circumferential direction C about the engine axis centerline 120, through a power output source 124.

In certain embodiments, such as depicted in FIG. 1, the engine 100 is an un-ducted thrust producing system, such that the plurality of fan blades 108 is unshrouded by a nacelle or fan casing. As such, in various embodiments, the engine 100 may be configured as an unshrouded turbofan engine, an open rotor engine, or a propfan engine. In particular embodiments, the engine 100 is a single unducted rotor engine including a single row of fan blades 108. The engine 100 configured as an open rotor engine includes the fan assembly 104 having large-diameter fan blades 108, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally higher cruise speed than aircraft with turboprop engines), and/or relatively low rotational speeds. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft. and approximately 45,000 ft. In still certain embodiments, cruise altitude is expressed in flight levels (FL) based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

Although depicted above as an unshrouded or open rotor engine in FIG. 1, it should be appreciated that the gear assemblies disclosed herein may be applied to shrouded or ducted engines, partially ducted engines, aft-fan engines, or other turbomachine configurations, including those for marine, industrial, or aero-propulsion systems. In addition, the gear assemblies disclosed herein may also be applicable to turbofan, turboprop, or turboshaft engines.

Figure 2:
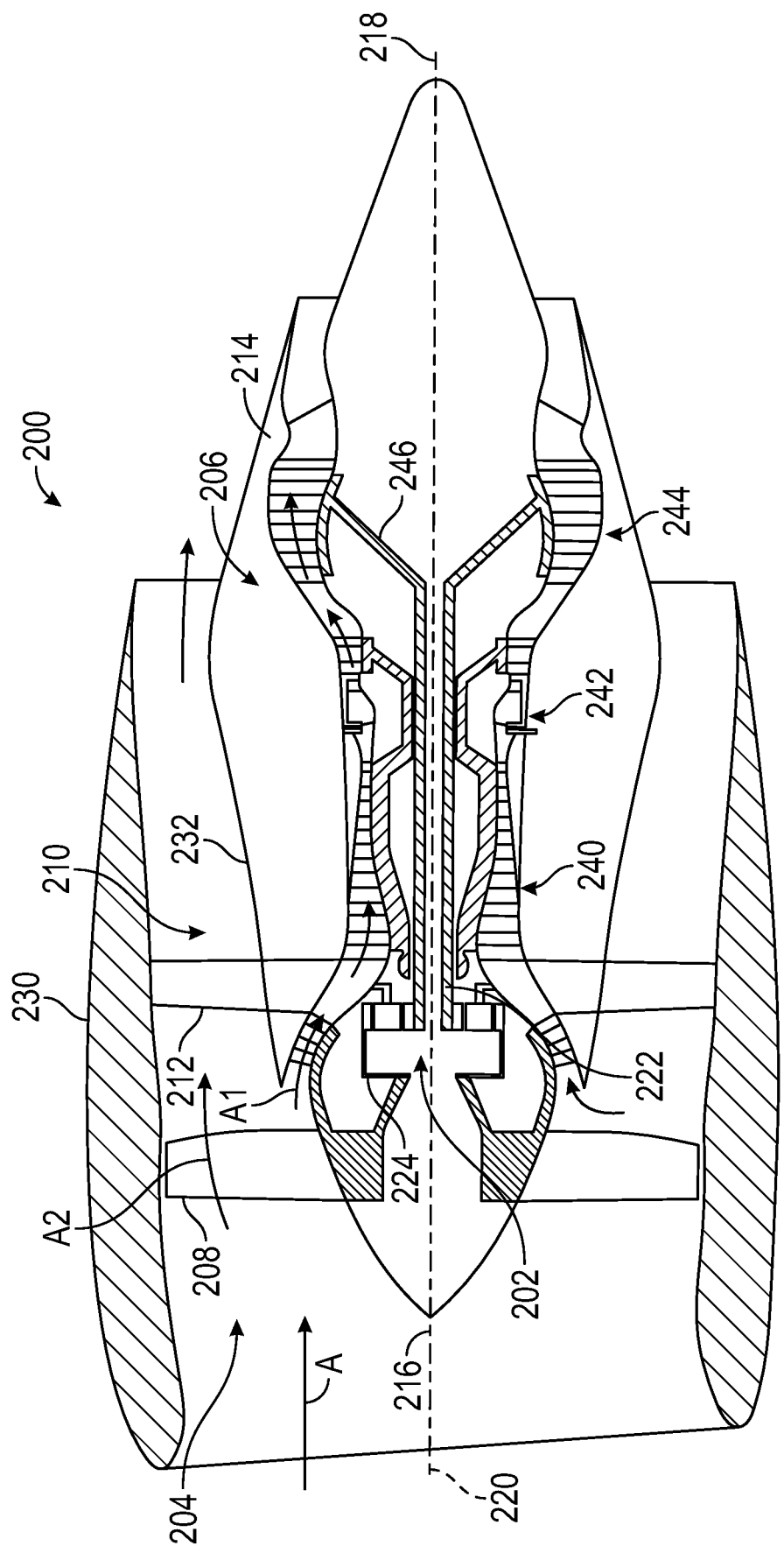
FIG. 2 is a cross-sectional schematic illustration of an exemplary embodiment of a ducted propulsion system.

For example, FIG. 2 is a cross-sectional schematic illustration of an exemplary embodiment of an engine 200 that includes the gear assembly 202 in combination with a ducted fan propulsion system. However, unlike the open rotor configuration of FIG. 2, the fan assembly 204 and its fan blades 208 are contained within an annular fan case 230 and the vane assembly 210 and the vanes 212 extend radially between the fan case 230 and the inner surface of the fan case 230. As discussed above, the gear assemblies disclosed herein can provide for increased gear ratios for a fixed gear envelope (e.g., with the same size ring gear), or alternatively, a smaller diameter ring gear may be used to achieve the same gear ratios.

As shown in FIG. 2, the core engine 206 is generally encased in outer casing 214, and has a length extending from a longitudinally forward end 216 to a longitudinally aft end 218. The exemplary core engine (for a ducted or unducted engine) can include a compressor section 240, a heat addition system 242 (e.g., combustor), and an expansion section 244 together in serial flow arrangement. The core engine 206 extends circumferentially relative to an engine centerline axis 220. The core engine 206 includes a high-speed spool that includes a high-speed compressor and a high-speed turbine operably rotatably coupled together by a high-speed shaft. The heat addition system 232 is positioned between the high-speed compressor and the high-speed turbine. Various embodiments of the heat addition system 232 include a combustion section. The combustion section may be configured as a deflagrative combustion section, a rotating detonation combustion section, a pulse detonation combustion section, or other appropriate heat addition system. The heat addition system 242 may be configured as one or more of a rich-burn system or a lean-burn system, or combinations thereof. In still various embodiments, the heat addition system 242 includes an annular combustor, a can combustor, a cannular combustor, a trapped vortex combustor (TVC), or other appropriate combustion system, or combinations thereof.

The core engine 206 can also include a booster or low-speed compressor positioned in flow relationship with the high-speed compressor. The low-speed compressor is rotatably coupled with the low-speed turbine via a low-speed shaft 246 to enable the low-speed turbine to drive the low-speed compressor. The low-speed shaft 246 is also operably connected to gear assembly 202 to provide power to the fan assembly 204 via the power input source 222, such as described further herein.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low-speed turbine" defines a component configured to operate at a rotational speed, such as a maximum allowable rotational speed, lower than a "high turbine" or "high-speed turbine" at the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed turbine within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

As discussed in more detail below, the core engine includes the gear assembly that is configured to transfer power from the expansion section and reduce an output rotational speed at the fan assembly relative to a low-speed turbine. Embodiments of the gear assemblies depicted and described herein can allow for gear ratios suitable for large-diameter unducted fans (e.g., FIG. 1) or certain turbofans (e.g., FIG. 2). Additionally, embodiments of the gear assemblies provided herein may be suitable within the radial or diametrical constraints of the core engine within the outer casing.

The gear assemblies described herein includes a gear set for decreasing the rotational speed of the fan assembly relative to the low speed (pressure) turbine. In operation, the rotating fan blades are driven by the low speed (pressure) turbine via gear assembly such that the fan blades rotate around the engine axis centerline and generate thrust to propel the engine, and hence an aircraft on which it is mounted, in the forward direction.

FIGS. 1 and 2 illustrate what may be termed a "puller" configuration where the fan assembly is located forward of the engine core. Other configurations are possible and contemplated as within the scope of the present disclosure, such as what may be termed a "pusher" configuration embodiment where the engine core is located forward of the fan assembly. The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

In the exemplary embodiment of FIG. 1, air enters the core engine 106 through an opening aft of the fan blades. FIG. 2 illustrates such an opening in more detail. As shown in FIG. 2, air A entering the fan assembly is divided between air that enters the core engine A1 and air that bypasses the core engine A2.

Embodiments of the gear assemblies depicted and described herein may provide for gear ratios and arrangements that fit within the $L/D_{max}$ constraints of the engine. In certain embodiments, the gear assemblies depicted and described allow for gear ratios and arrangements providing for rotational speed of the fan assembly corresponding to one or more ranges of cruise altitude and/or cruise speed provided above.

Various embodiments of the gear assemblies provided herein can allow for gear ratios of up to 14:1. Still various embodiments of the gear assembly can allow for gear ratios of at least 6:1. Still yet various embodiments of the gear assembly provided herein allow for gear ratios between 6:1 to 12:1, between 7:1 and 11:1, and between 8:1 and 10:1. It should be appreciated that embodiments of the gear assembly provided herein may allow for large gear ratios and within constraints such as, but not limited to, length (L) of the engine 10, maximum diameter ($D_{max}$) of the engine, cruise altitude of up to 65,000 ft, and/or operating cruise speed of up to Mach 0.85, or combinations thereof.

Various exemplary gear assemblies are shown and described herein. These gear assemblies may be utilized with any of the exemplary engines and/or any other suitable engine for which such gear assemblies may be desirable. In such a manner, it will be appreciated that the gear assemblies disclosed herein may generally be operable with an engine having a rotating element with a plurality of rotor blades and a turbomachine having a turbine and a shaft rotatable with the turbine. With such an engine, the rotating element (e.g., fan assembly) may be driven by the shaft (e.g., low-speed shaft) of the turbomachine through the gear assembly.

Figure 3:
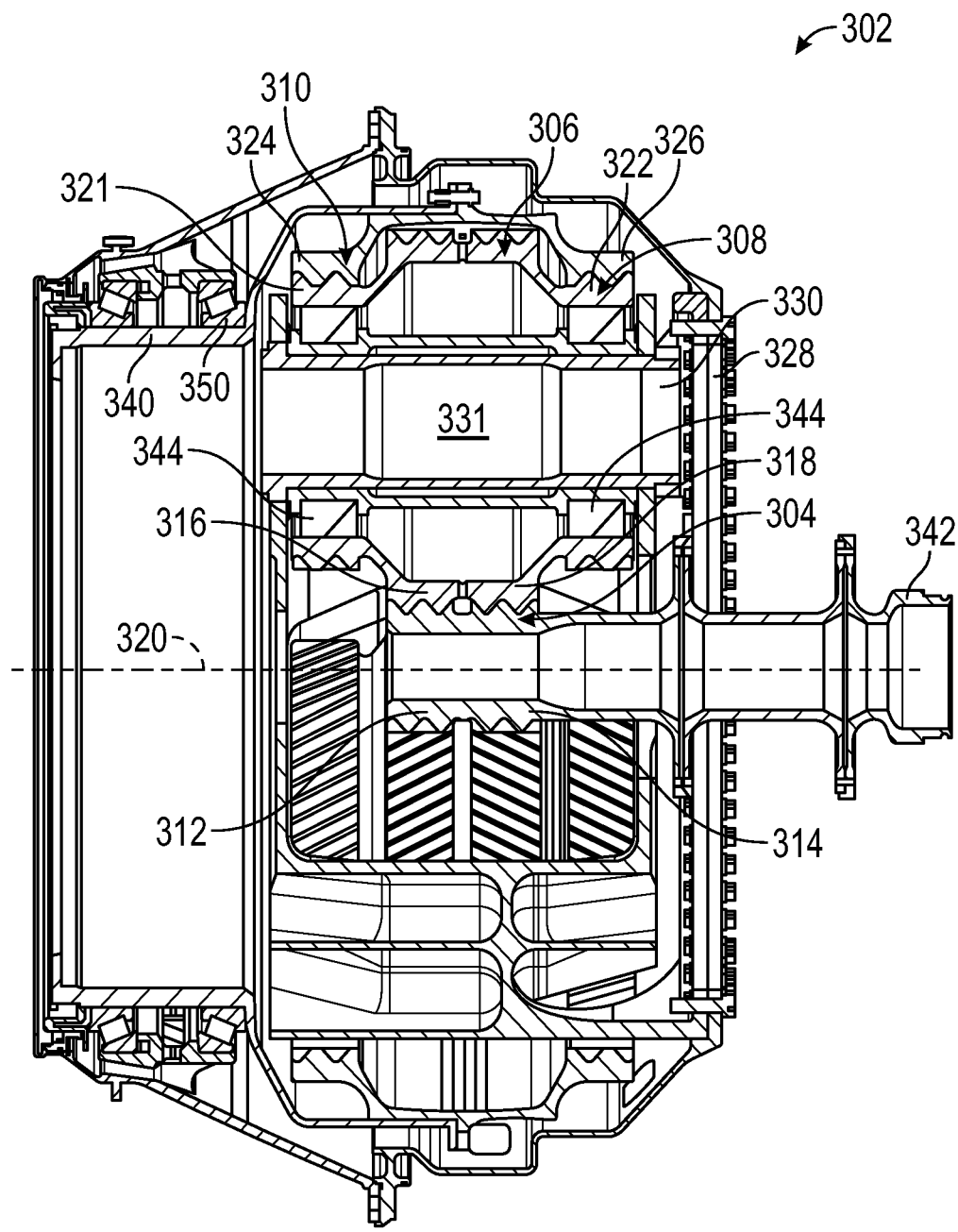
FIG. 3 is a schematic illustration of an exemplary gear assembly.

FIG. 3 illustrates an exemplary gear assembly 302 with a compound symmetrical arrangement. Gear assembly 302 includes a sun gear 304 with a diameter $D_s$, a plurality of first stage planet gears 306 with a diameter $D_{p1}$, a plurality of second stage planet gears 308 with a diameter $D_{p2}$, and a ring gear 310 with a diameter $D_r$. Each of the sun gear 304, planet gears 306, 308, and ring gear 310 are double helical gears with first and second sets of helical teeth that are inclined at an acute angle relative to each other. In particular, sun gear 304 comprises a first sun gear set 312 and a second sun gear set 314. Each of the first stage planet gears comprises a first planet gear set 316 and second planet gear set 318, and each of the second stage planet gears comprises a third planet gear set 321 and a fourth planet gear set 322. The ring gear 310 comprises a first ring gear set 324 and a second ring gear set 326. The ring gear shown in FIG. 3 comprises two halves with an interconnecting flanged portion.

Figure 4:
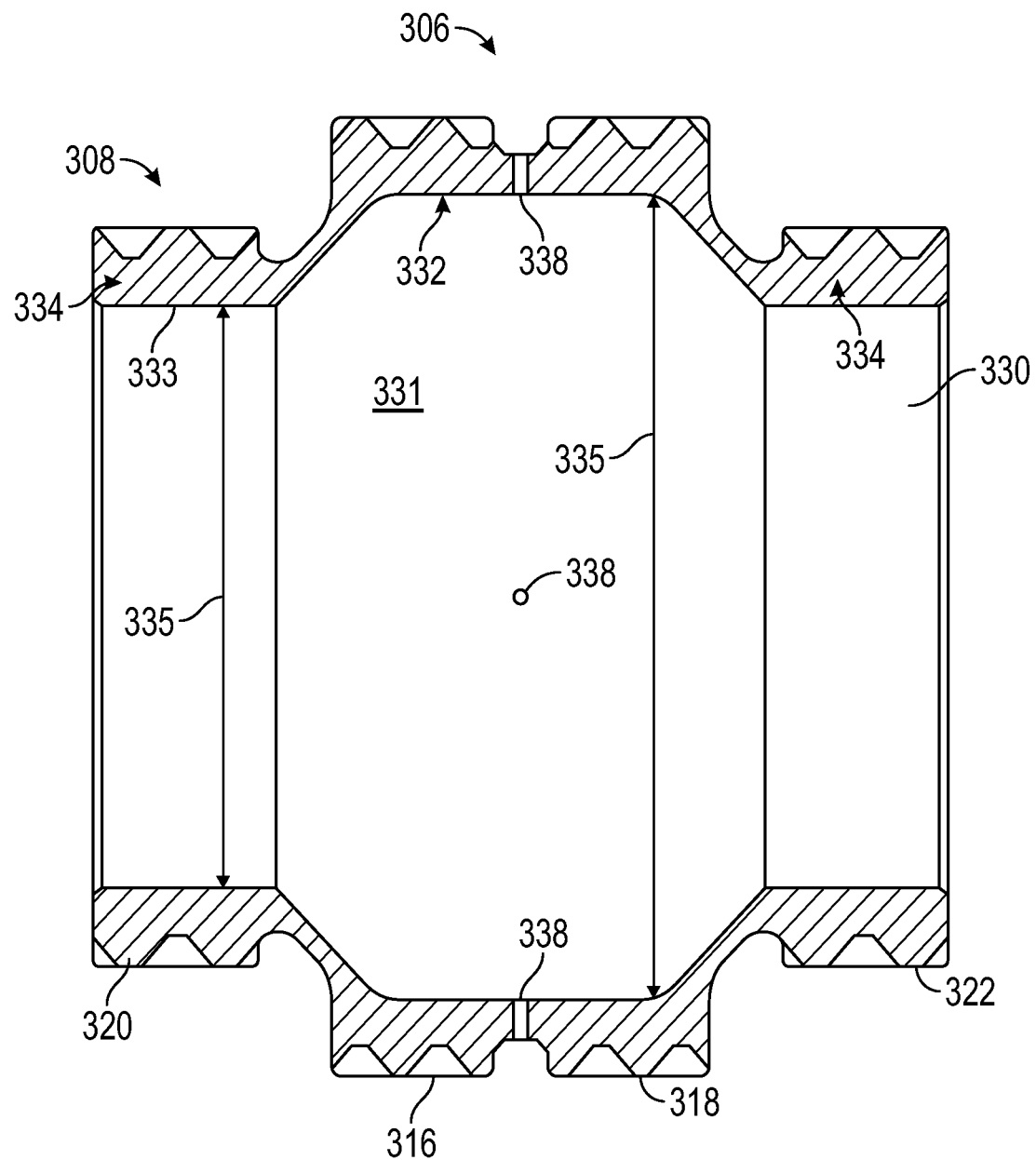
FIG. 4 is a cross-sectional view of an exemplary planet gear layshaft.

The compound planet gears 306, 308 are supported by a layshaft 330 that has a tubular configuration. As used herein "tubular" means a longitudinally extending structure that is at least partially hollow to define an interior passageway 331 as shown in FIG. 4. The tubular layshaft 330 can comprise an inner surface 333. The tubular layshaft 330 also supports and/or carriers the first and second stage planet gears on its external surface as shown in FIGS. 3 and 4.

The tubular layshaft can comprise an intermediate portion 332 that supports the first stage planet gears 306 between two outer portions 334. As shown in FIG. 4 (and elsewhere), a diameter of the first stage planet gears $D_{p1}$ can be greater than a diameter of the second stage planet gears $D_{p2}$. In some embodiments, a ratio of $D_{p1}:D_{p2}$ can vary from 1.0 to 2.0, or in some embodiments, from 1.2 to 1.7, or from 1.3 to 1.6, or from 1.4 to 1.5.

Because of the difference in diameters of the first and second stage planet gears, the tubular layshaft 330 can similarly vary to support these gears. Thus, as shown in FIG. 4, the intermediate portion 332 has a greater diameter than the outer portions 334, with angled portions of the layshaft extending between the intermediate portion 332 and outer portions 334.

In some embodiments, layshaft 330 can comprise a plurality of holes 338 to scavenge lubricating oil within the gear assembly. As shown in FIG. 4, the plurality of holes 338 can extend circumferentially around the layshaft 330 at the intermediate portion 332 (e.g., the enlarged portion) between first and second outer portions 334.

Figure 5:
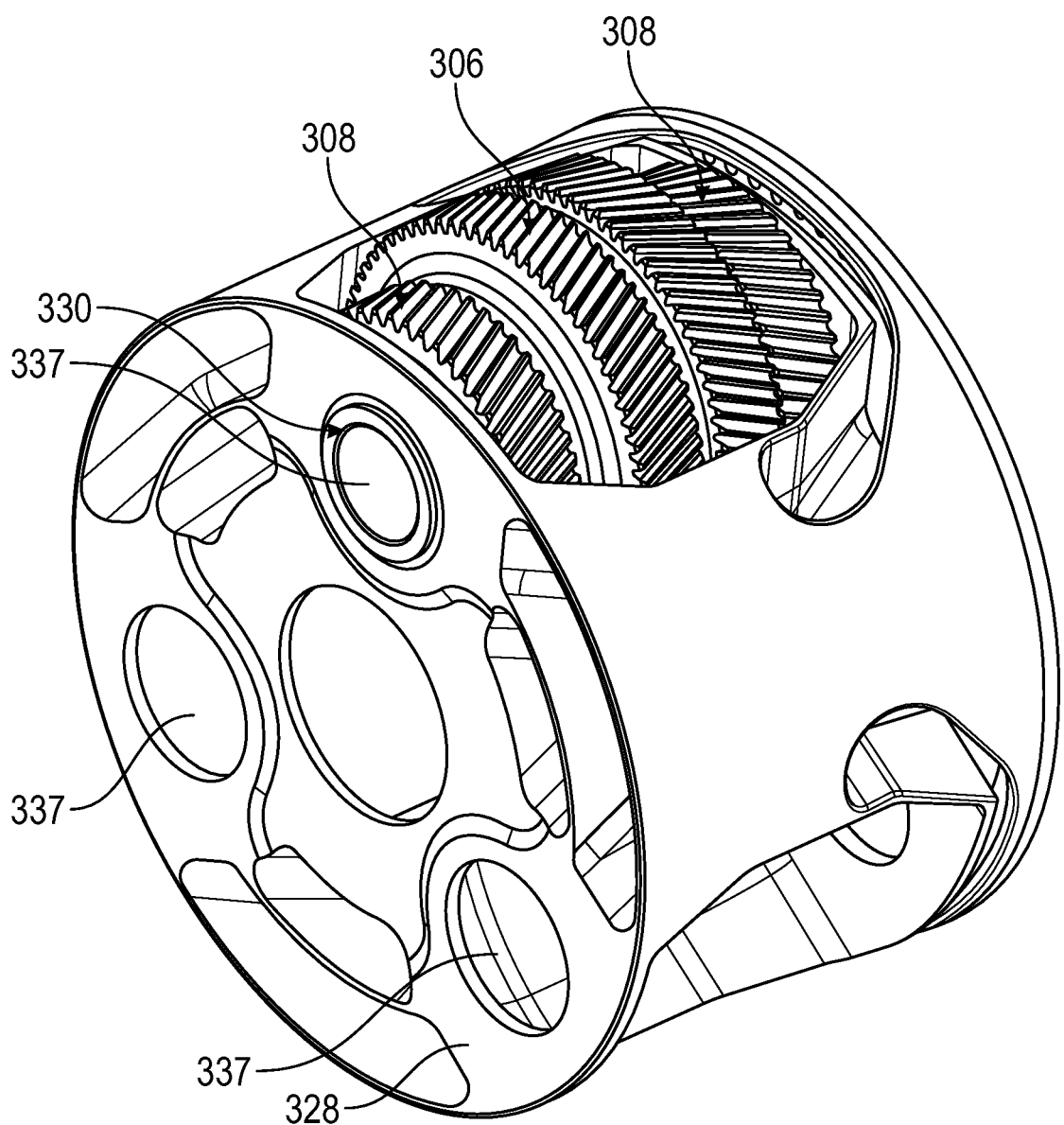
FIG. 5 is a schematic illustration of an exemplary planet gear layshaft with first and second stage planet gears.

FIG. 5 illustrates a planet carrier 328 with a single compound planet gear (306, 308) provided therein for clarity. The layshafts 330 extend through openings 337 in the fore and aft sides of the planet carrier 328. Since there is only one planet gear shown in FIG. 5, only one layshaft 330 is depicted. However, it should be understood that each opening 337 would include a respective layshaft 330. In some embodiments, the carrier can be connected to the engine frame via a flexible support system, with the flexible support system being configured to collect oil and scavenge oil via holes at a lower portion.

In the embodiment shown in FIG. 3, the gear assembly 302 is a star gear configuration in which the planet carrier is generally fixed (e.g., static) within the engine to a support structure. The sun gear 304 is driven by an input shaft (e.g., a low-speed shaft). A planet gear carrier 328 is rotatably coupled to a layshaft of the compound planet gears 306, 308, and the ring gear 310 is configured to rotate about the longitudinal engine axis centerline in a circumferential direction, which in turn drives the power output source (e.g., a fan shaft) that is coupled to and configured to rotate with the ring gear to drive the fan assembly. In this embodiment, the low-speed shaft rotates in a circumferential direction that is the opposite of the direction in which the fan shaft rotates.

In some embodiments, the gear ratio split between the first and second stages can range from 40% to 60% for each stage (i.e., from 40% to 60% for the first stage and from 60% to 40% for the second stage).

As discussed above, in some embodiments, the sun gear 304, planet gears 306, 308, and ring gear 310 can be double helical gears with first and second sets of helical teeth that are inclined at an acute angle relative to each other.

Referring again to FIG. 3, the ring gear 310 is coupled to a fan drive shaft 340 to drive a fan section. The sun gear 304 is coupled to an input power source (e.g., input shaft 342). In some embodiments, the input shaft can be integrally formed with the sun gear. The bi-helical meshes of the planet gears axially balance the load over the four (phased) gear sets of each compound planet gear. The second stage of planet gears 308 can be supported by two rows of cylindrical roller bearings 344 at the planet bore. In addition, the fan drive shaft 340 can be supported by tapered roller bearings 350, which supports the fan drive shaft in an axially compact manner. In some embodiments, the roller bearings can be formed from a ceramic material. In some embodiments, as shown in FIG. 3, an inner supporting element of both sets of the roller bearings 344 can be a solid unique elements.

Figure 6:
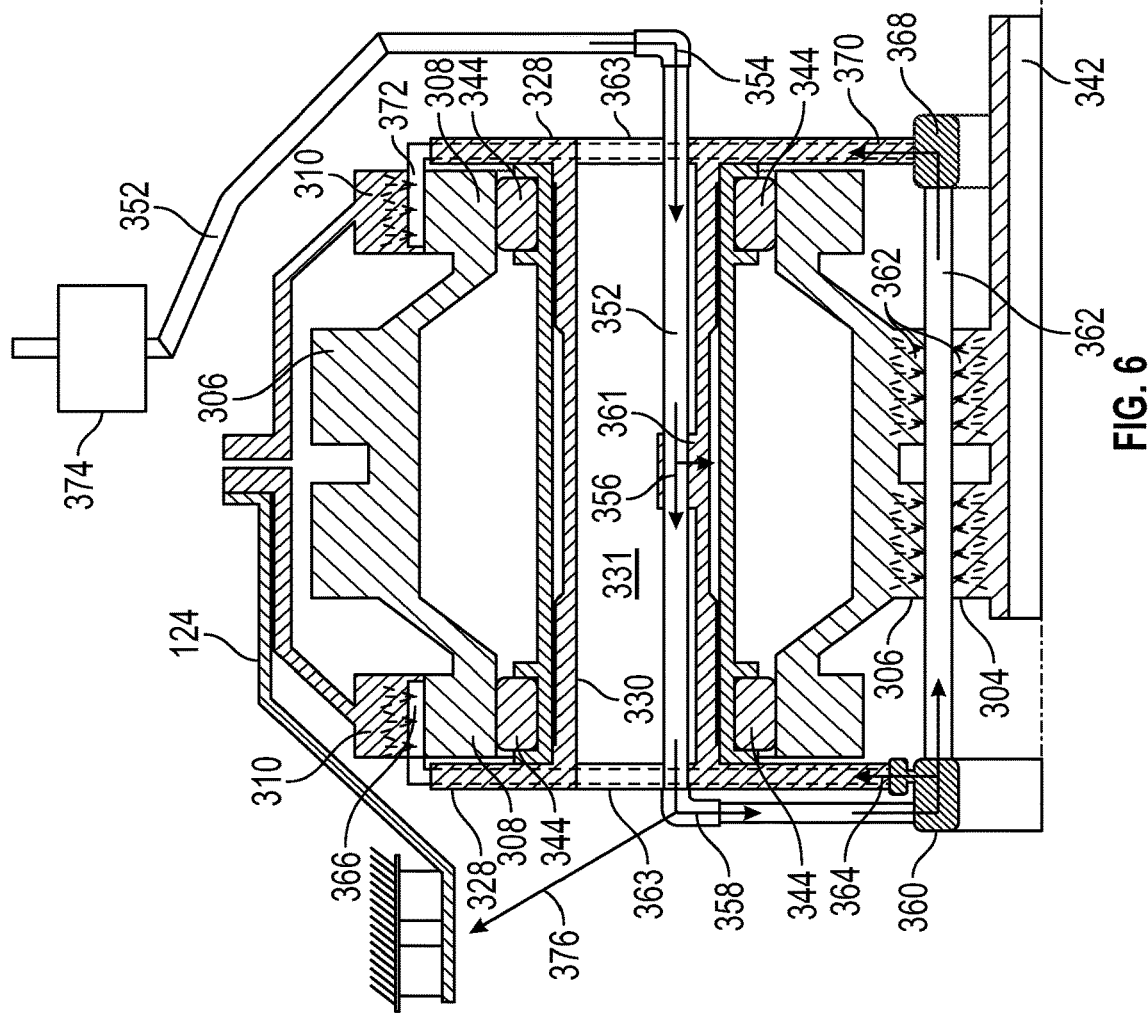
FIG. 6 is a schematic illustration of an exemplary lubrication fluid supply system for a gearbox.

As shown in FIG. 6, the layshafts 330 disclosed herein can provide the additional benefit of improved lubrication distribution. As discussed above, layshafts 330 are tubular structures that define interior passageways 331. The interior passageways 331 can facilitate lubrication distribution by allowing lubrication fluid supply lines 352 to pass through the layshaft 330. As shown in FIG. 6, to deliver lubrication fluid (e.g., oil) to flow from a remote location (e.g., oil reservoir) through one or more lubrication fluid supply lines 352 that extend through the layshaft 330.

The lubrication fluid can flow into the layshaft (as shown in arrow 354) through the layshaft (arrow 356) and out the other side of the layshaft (arrow 358) into a main manifold 360. From the main manifold 360, the lubrication fluid can be a first lubrication distribution system 362 configured to distribute lubrication fluid to a sun gear-mesh region where the sun gear 304 is configured to contact the first stage planet gears 306. First lubrication distribution system 362 can comprise a plurality of spraybars that distribute lubrication fluid to the sun gear-mesh region.

Lubrication fluid is also directed through a plurality of lubrication channels 363 within the carrier 328. As shown in FIG. 6, lubrication fluid is directed from the main manifold 360 through the lubrication channels (in the direction shown by arrow 364) to the ring gear-mesh region where the forward second stage planet gear 308 engages with the ring gear 310. A second lubrication distribution system 366 (e.g., one or more spraybars) directs lubrication fluid at the ring-gear mesh region of the forward second stage planet gear 308.

Lubrication fluid is also directed from the main manifold 360 to a second stage manifold 368, which directs lubrication fluid (in the direction shown by arrow 370) through one or more lubrication channels 363 in the carrier to the ring gear-mesh region where the aft second stage planet gear 308 engages with the ring gear 310. A third lubrication distribution system 372 (e.g., one or more spraybars) directs lubrication fluid at the ring-gear mesh region of the aft second stage planet gear 308.

As shown in FIG. 6, lubrication fluid can be spilled within the layshaft to provide lubrication fluid to the under-race channels of the layshaft bearings 344. In particular, the roller bearings 344 can be lubricated by directing the lubrication fluid spilled within the layshaft (e.g., through one or more openings 361 in the lubrication fluid supply line 352 that pass through the layshaft, which, in turn, is directed under the inner race and forced out through a plurality of holes in the inner race.

The interior passageway 331 can vary depending on the structural and/or functional requirements of the layshaft. In some embodiments, for example, the interior passageway can have a diameter 335 that varies along the length of the layshaft. FIG. 4 shows an exemplary embodiment where a first portion of the layshaft (e.g., intermediate portion 332) has a great diameter 335 than a second portion of the layshaft (e.g., outer portions 334).

A manifold, as used herein, refers to any structure that retain a volume of lubrication fluid. Manifolds 360, 368 described herein, can be formed of any suitable shape and/or volume to facilitate the distribution of the lubrication fluid in the systems disclosed herein. Similarly, the lubrication fluid supply lines disclosed herein can be formed of any suitable size and/or shape (e.g., straight, curved, etc.). As discussed above, the lubrication fluid supply lines can extend to one or more remote locations access lubrication fluid, such a gearbox sump or other reservoir of lubrication fluid. In the embodiment shown in FIG. 6, the lubrication fluid supply lines also pass though one or more engine strut 374.

In some embodiments, lubrication fluid directed through the layshafts 330 can also be directed to other locations. For example, an oil transfer bearing for a pitch control mechanism can be provided on a fore side of the gear assembly, and gear assembly/pitch control oil feed lines can be provided through the static planet carrier, as shown schematically by arrow 376.

Figure 7:
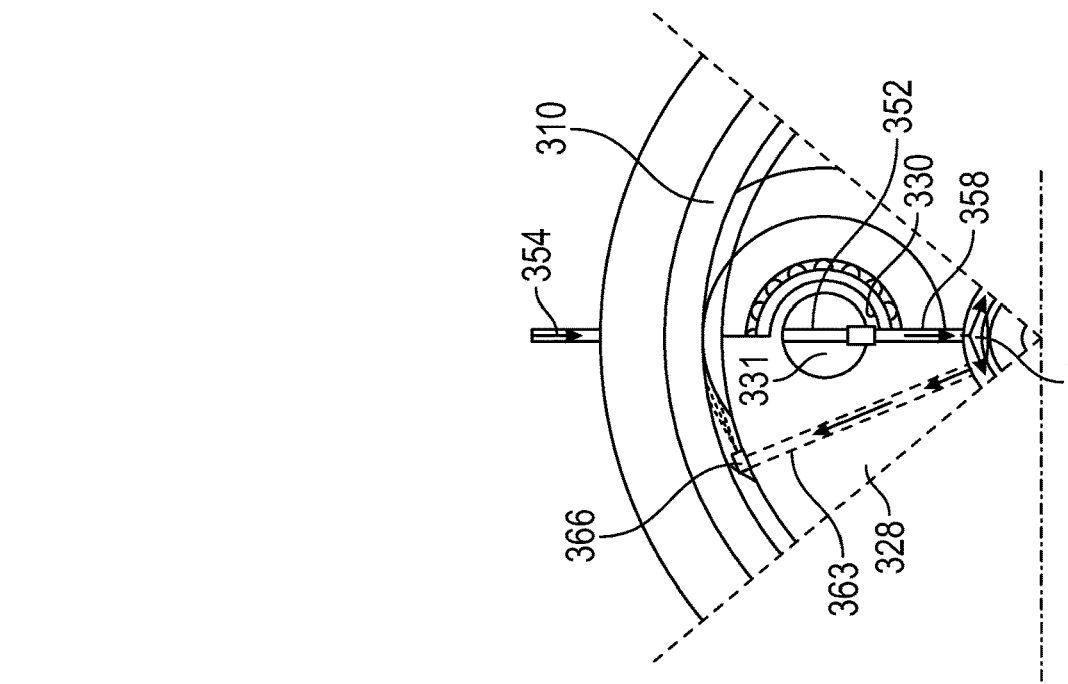
FIG. 7 is a schematic illustration of a portion of the exemplary lubrication fluid supply system illustrated in FIG. 6.

FIG. 7 illustrates a front view of a portion of the system shown in FIG. 6. As shown in FIG. 7, lubrication fluid is directed through one or more supply lines 352, through an interior passageway 331 of a layshaft 330 to a forward side of the layshaft 330. The lubrication fluid is further directed to a main manifold 360 and then to lubrication distribution systems 362, 366, 372. Lubrication fluid directed to the ring-gear mesh region is directed through one or more lubrication channels 363 in the carrier 328. For example, as shown in FIG. 6, for each layshaft 330, at least two lubrication channels 363 in the carrier 328 are provided (one forward, one aft) to feed the second and third lubrication distribution systems 366, 372.

Figure 8:
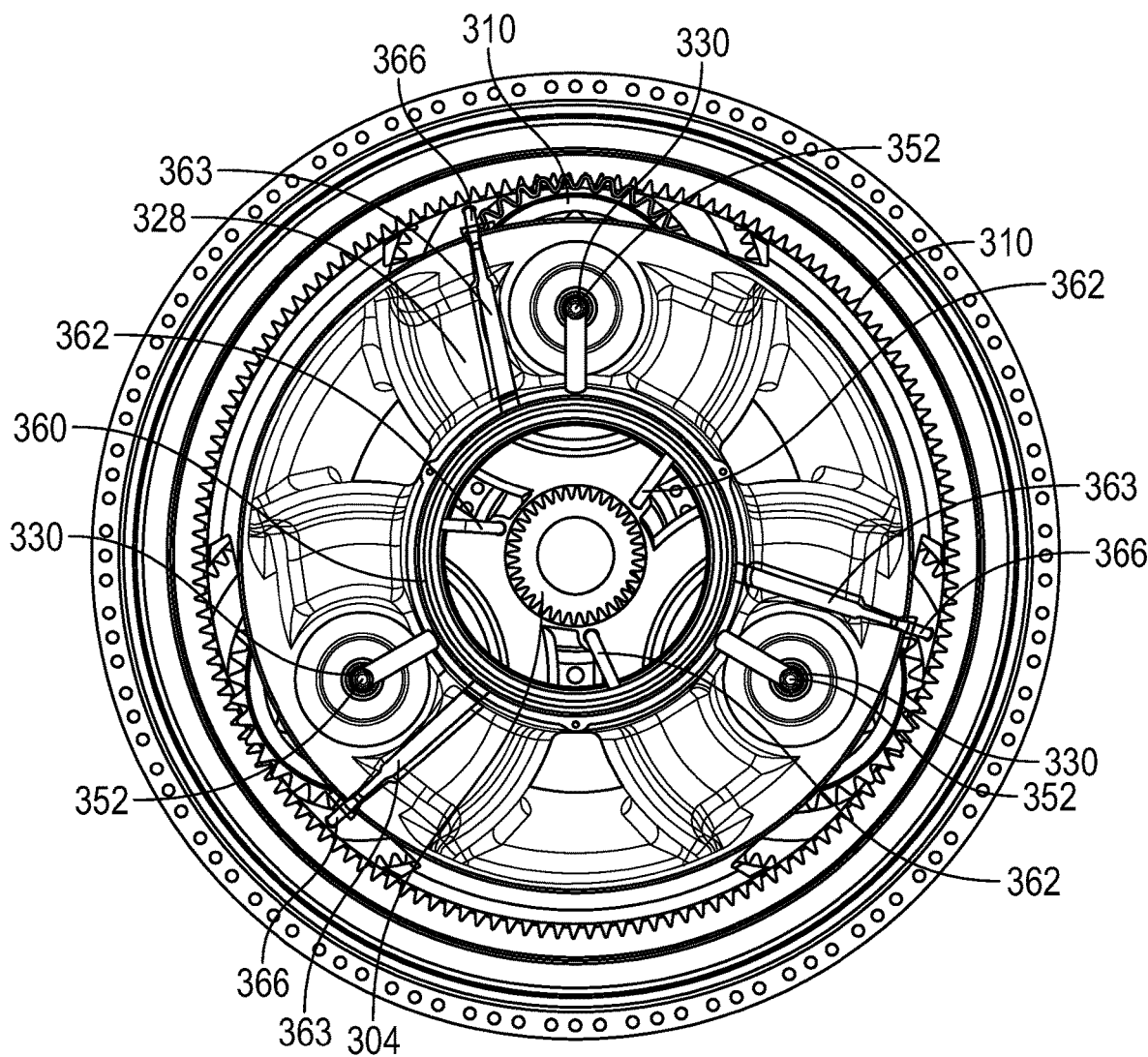
FIG. 8 is a schematic illustration of an exemplary lubrication fluid supply system for a gearbox.

FIG. 8 illustrates the distribution of lubrication fluid to different gear mesh regions of the system. As shown in FIG. 8, lubrication fluid is delivered through lubrication fluid supply lines 352 that pass through layshaft 330 to a main manifold 360 for distribution to the various gear meshes. For example, as described elsewhere, lubrication fluid can be distributed to the first lubrication distribution system 362 at the sun gear-mesh region where the sun gear 304 is configured to contact the first stage planet gears 306. Lubrication fluid is also directed through a plurality of lubrication channels 363 within the carrier 328. As shown in FIG. 8, lubrication fluid is directed from the main manifold 360 through the lubrication channels 363 to a second lubrication distribution system 366 at the ring gear-mesh region where the forward second stage planet gear 308 engages with the ring gear 310.

Figure 9A:
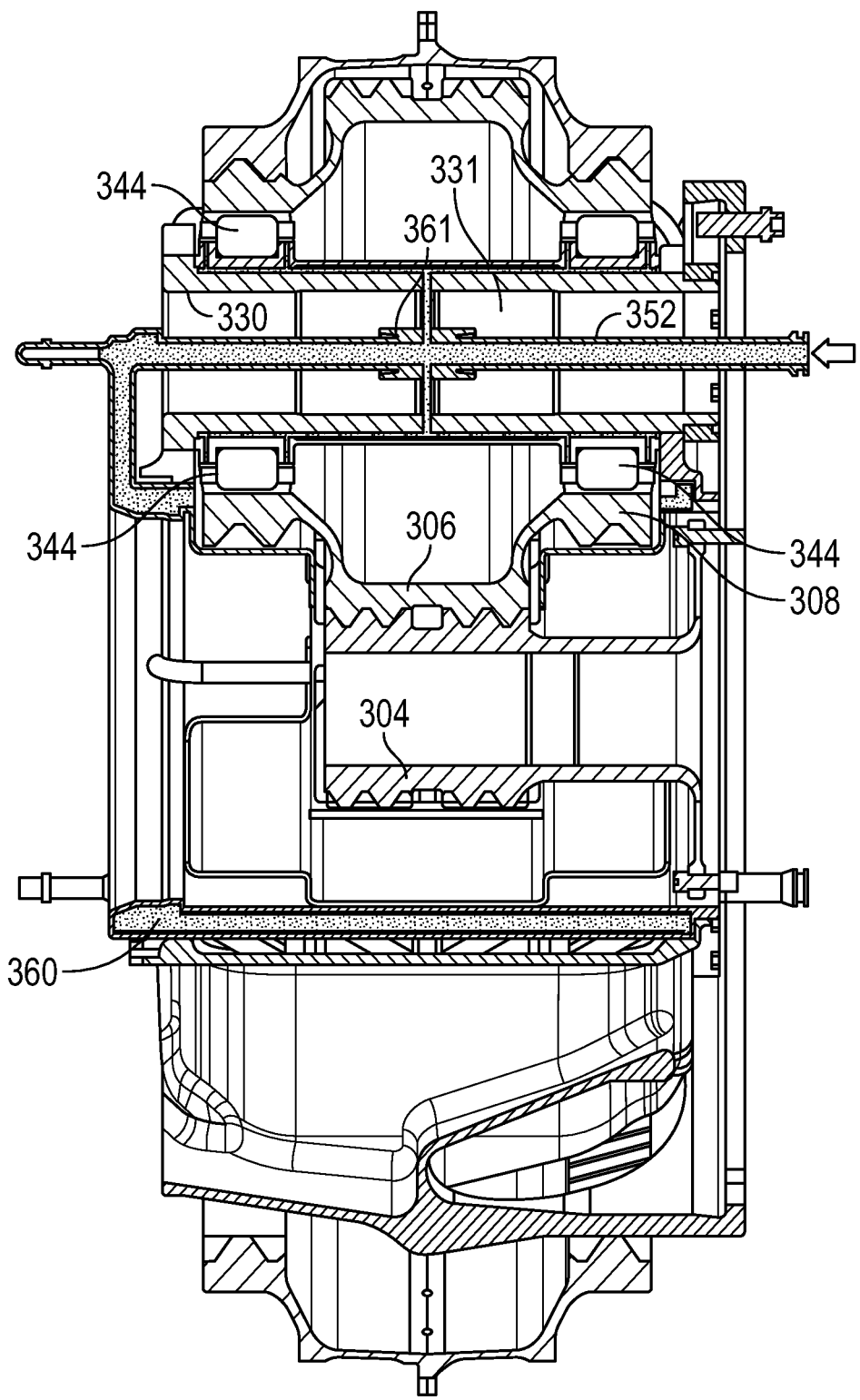
FIGS. 9A, 9B, and 9C are cross-sectional views of the gearbox illustrated in FIG. 8.

FIG. 9A is a cross-sectional view of FIG. 8 showing the passage of the lubrication fluid supply lines 352 through the interior passageway 331 of layshaft 330. As shown in FIG. 9A, lubrication fluid can be spilled within the layshaft 330 through the opening(s) 361 in the lubrication fluid supply lines 352 to provide lubrication fluid to the under-race channels of the layshaft bearings 344.

Figure 9B:
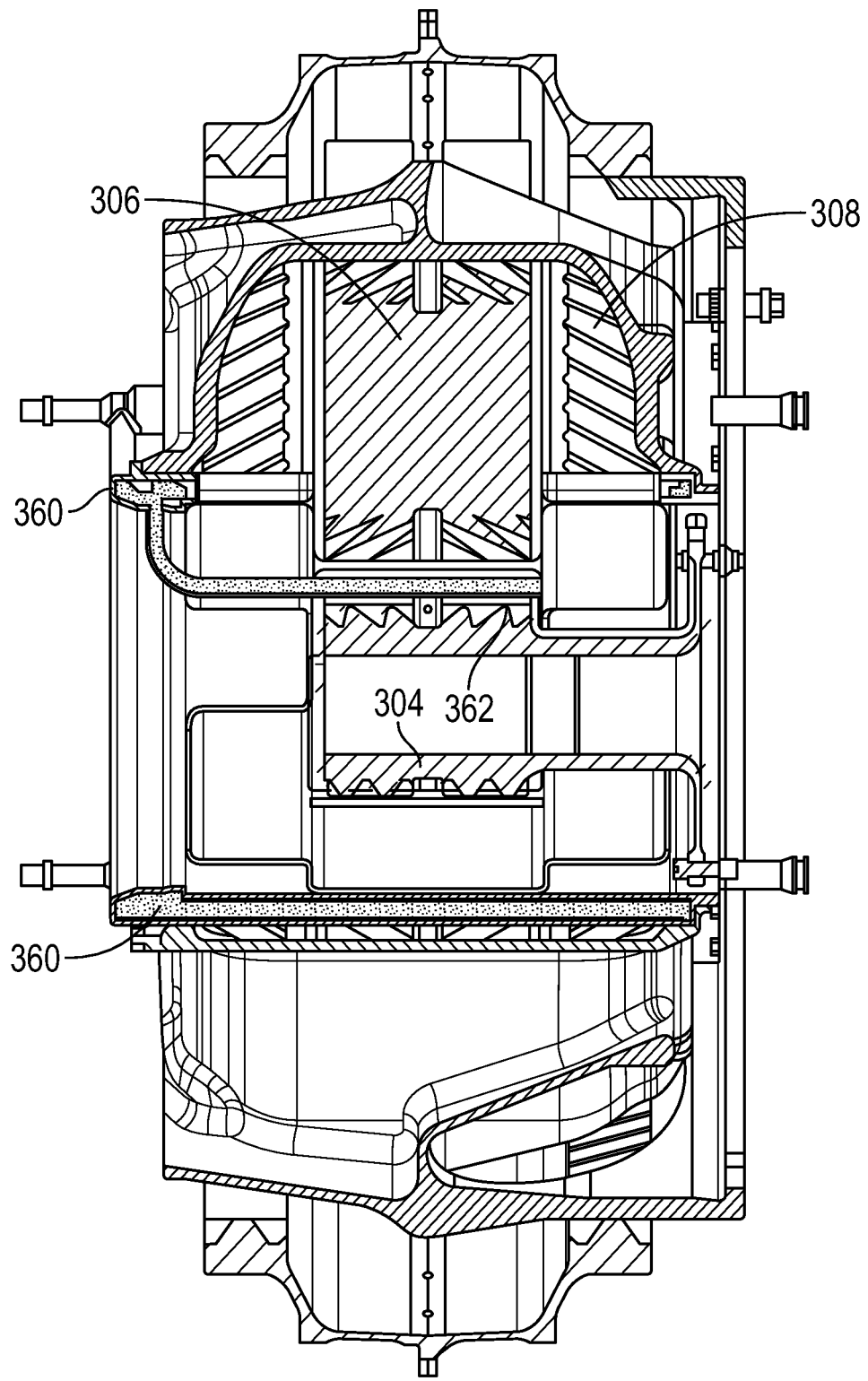

FIG. 9B is a cross-sectional view of FIG. 8 showing an exemplary path of lubrication fluid from the main manifold 360 to the first lubrication distribution system 362 at the sun gear-mesh region where the sun gear 304 is configured to contact the first stage planet gears 306.

Figure 9C:
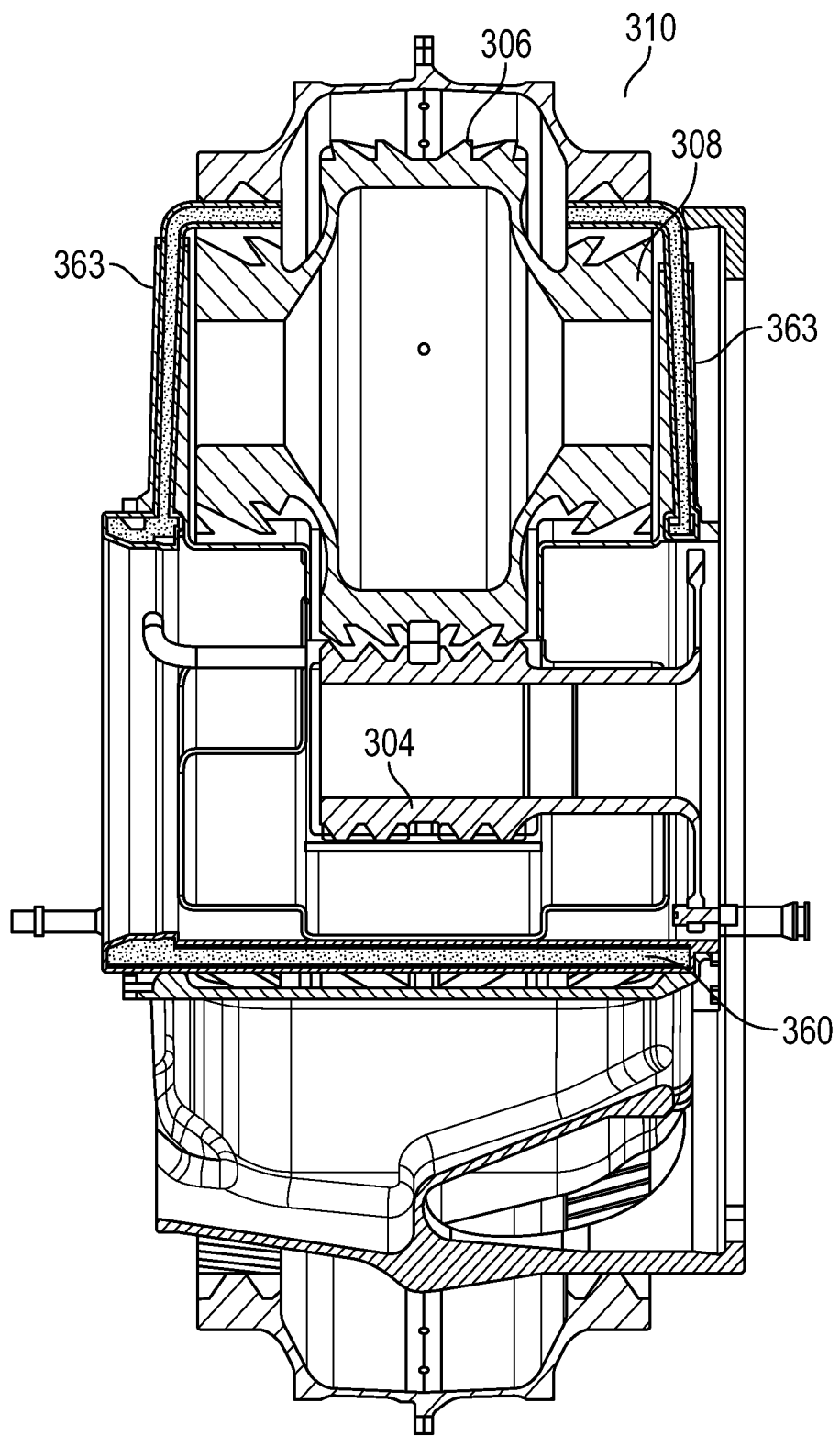

FIG. 9C is another cross-sectional view of FIG. 8 showing an exemplary path of lubrication from the main manifold 360 through the lubrication channels 363 to the second lubrication and third distribution systems 366, 372 at the ring gear-mesh region where the forward and aft second stage planet gears 308 engage with the ring gear 310.

FIG. 10 is directed to a scavenge system that collect and redirect lubrication fluid to a scavenge port of the lubrication system. The ring gear 310 can comprise a plurality of radial drain holes 378 at an outermost radius of the ring gear 310. As the ring gear spins, lubrication fluid within the ring gear 310 is pushed toward the inner walls of the ring gear and is directed to the radial drain holes 378 as shown by arrows 380. In addition, one or more openings 382 between the fore and aft first stage planet gears permit lubrication fluid from the under race bearings 344 to be directed towards the inner walls of the ring gear, and in turn, the plurality of radial drain holes 378 as shown by arrow 384.

As shown in FIG. 10, the static support structure 386 of carrier 328 surrounds at least a portion of the ring gear 310 and can direct lubrication fluid from the ring gear drain holes 378 toward a main collector area 387 as shown by arrow 388. In addition, the static support structure 386 can comprises one or more gutter windows 390 spaced apart from the main collector area to cope with pitch and roll attitude conditions. Thus, during flight cruise conditions most of the lubrication fluid can be directed toward the main collector area below a main opening 392 in the static support structure 386, while pitch and roll attitude conditions may result in more lubrication fluid (relative to flight cruise conditions) to be directed to the one or more off-center gutter windows 390.

Angled sump walls 394 can extend along and below the static support structure 386 to collect and direct lubrication fluid towards the main collector area as shown by arrow 396. In addition to the lubrication fluid from the gearbox, lubrication fluid from other components can bypass the gutter windows 390 of the static support structure of the carrier as shown by arrows 398, and be directed by gravity to the main collector area. In addition, the static support structure with gutter windows provide a shroud for the other lubrication fluid flows, thereby protecting the sump walls 394 from the spinning gears and lubrication distribution systems.

In operation, all the lubrication fluid from the gearbox is directed towards the static support structure and its gutter windows 390 and/or main opening 292. This lubrication fluid, along with lubrication fluid from other components of the engine are guided down to the main collector by gravity, before finally reaching a scavenge port 400. In some embodiments, the scavenge port can also be integrated within the engine's strut 402, as shown in FIG. 10.

Figure 11:
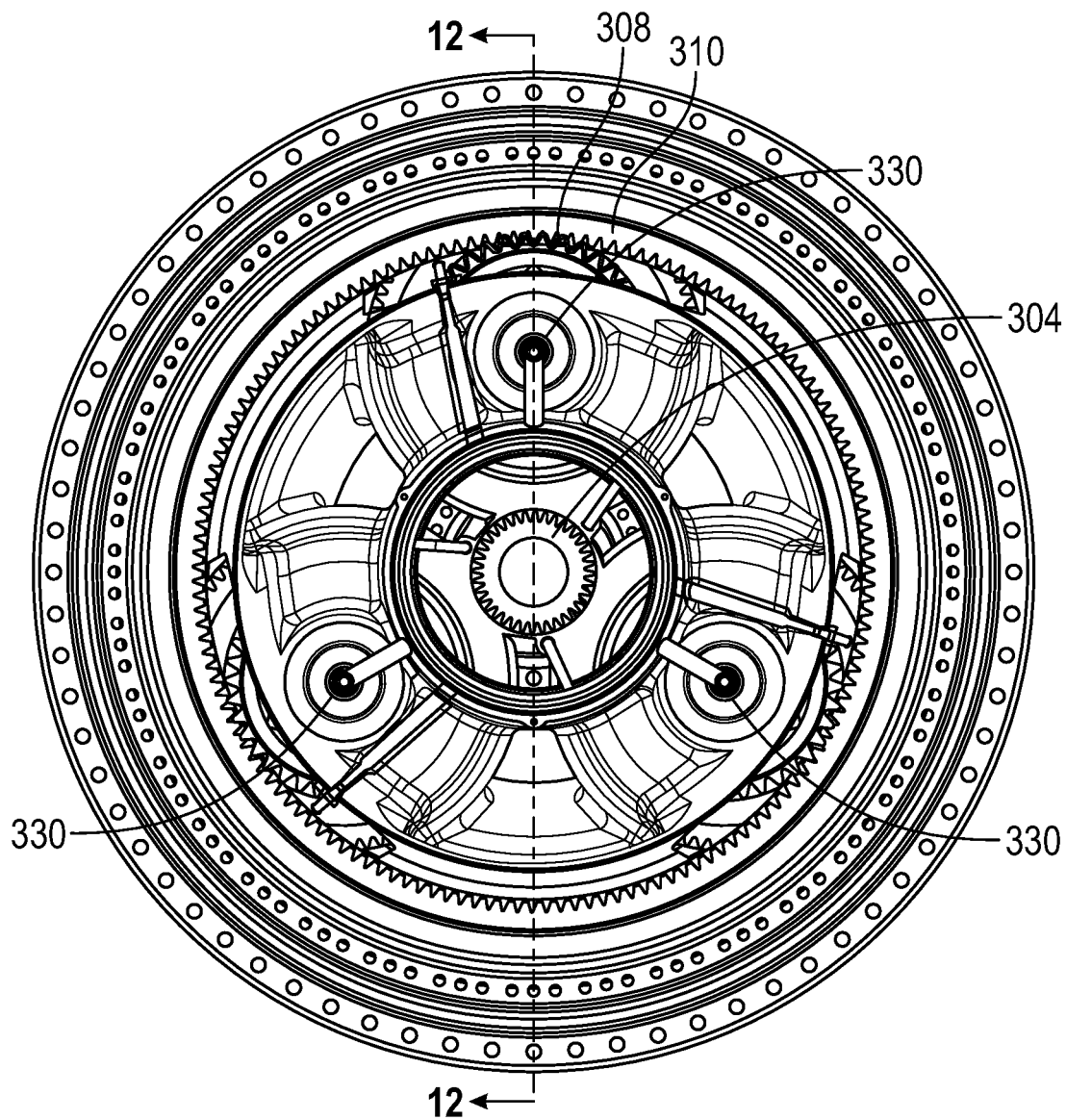
FIG. 11 is a schematic illustration of an exemplary gearbox.
Figure 12:
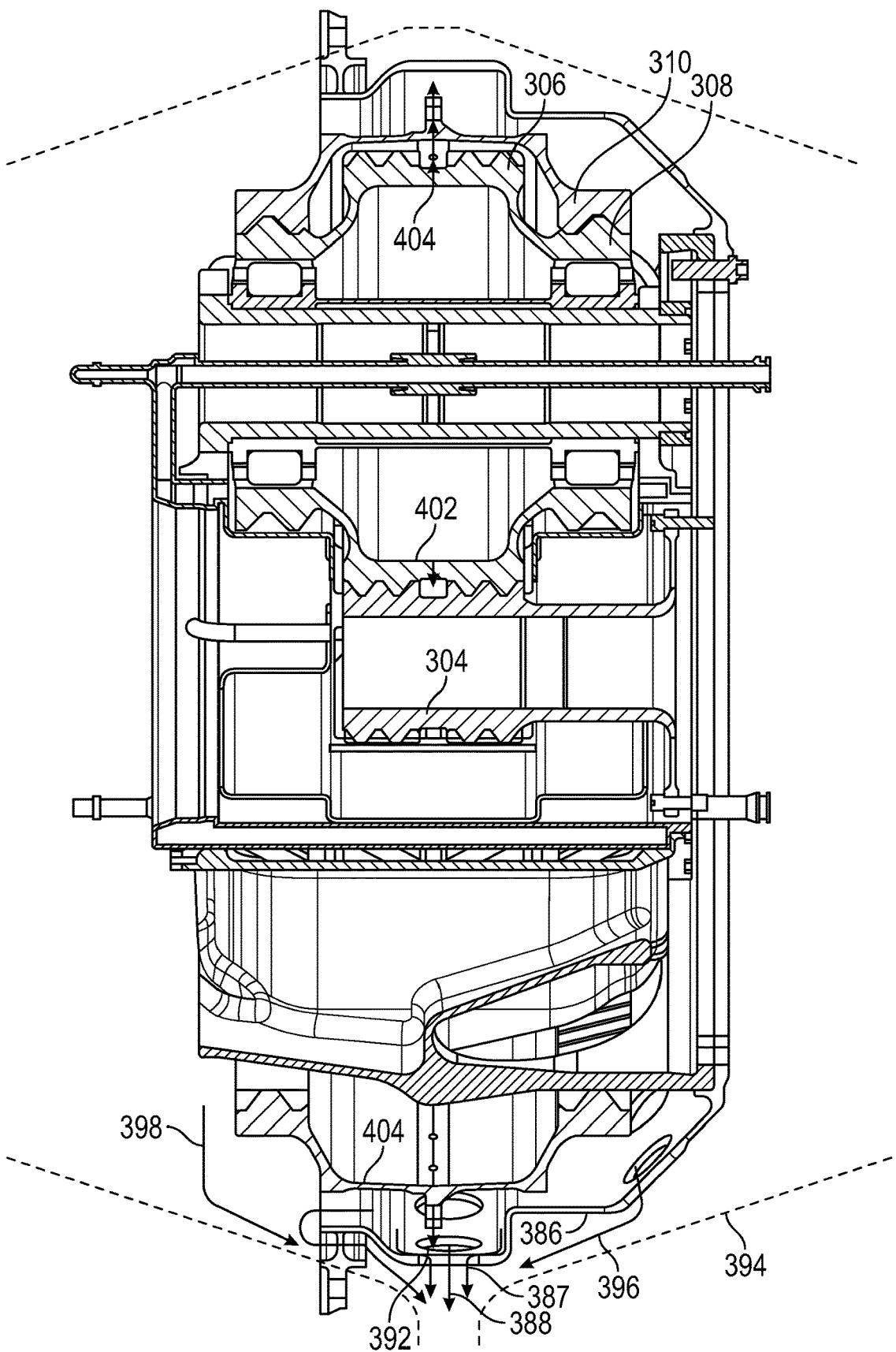
FIG. 12 is a cross-sectional view of the exemplary gearbox shown in FIG. 11, showing an exemplary lubrication collection system.

FIG. 11 shows a side view of an exemplary epicycle gear system and FIG. 12 illustrates a cross-sectional view of the gear system taken along line 12-12. FIG. 12 illustrates an exemplary location of lubrication fluid and the direction of flow of the lubrication fluid within the system. As shown in FIG. 12, lubrication fluid is delivered to the sun gear-mesh region 402 where the sun gear 304 is configured to contact the first stage planet gears 306, and lubrication fluid is directed through the ring gear drain holes and through the main opening 392 in the static support structure 386 toward a main collector area 387 as shown by arrows 388. Angled sump walls 394 extend along and below the static support structure 386 to collect and direct lubrication fluid towards the main collector area as shown by arrow 396. As discussed above, lubrication fluid from other components can bypass the openings of the static support structure as shown by arrows 398, and be directed by gravity to the main collector area.

Accordingly, in some embodiments, the lubrication fluid collection system described herein provides a three-level scavenge configuration. First, lubrication fluid is radially ejected through a series of radial drain holes at the outermost radius of the spinning ring gear. Second, the static frame of the carrier's support provides a circumferential gutter that serves as a first collector of the ejected lubrication fluid, drastically reducing the lubrication fluid's kinetic energy. Third, the static frame of the carrier's support features a plurality of dedicated gutter windows to allow for the gravitational drain to a main collector which is obtained from the sump's walls and collects the oil of the whole sump to the scavenge port. As a result, there will be a significant improvement on the abatement of the fluid-dynamic effects associated with the momentum of the spinning lubrication fluid, which can improve the efficiency of the scavenge system.

In addition, the integration between the scavenge system and the carrier's static support reduce and/or eliminate the need for any additional static parts for the collector. In other words, the carrier itself can function as an oil gutter, reducing the weight and cost of the system. The gutter's windows are also configured to cope with the whole flight envelope (including pitch and roll attitude conditions), thus providing a full scavenge capability during all operating conditions. This can reduce the risk of additional windage losses associated with oil churning and foaming, keeping the gearbox efficiency to its nominal value throughout its operation. As a secondary function, the intermediate gutter also serves as a protection to the additional oil paths coming from the other components in the sump. Therefore, while the carrier's gutter collects the oil only from the gearbox, the sump collector gathers all the oil from the sump, thus optimizing the management of the oil flows and the scavenge efficiency. The scavenge port can also be integrated within the engine's strut, saving a significant amount of radial space and keeping the whole scavenge system considerably compact with respect to the gearbox's radial envelope. As a consequence of the integration with the carrier's static structure, the scavenge system has little or no impact on the assembly sequence of the gearbox.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A turbomachine engine (100, 200) comprising a fan assembly (104, 204) comprising a plurality of fan blades (108, 208); a core engine (106, 206) comprising a turbine and an input shaft (122, 222) rotatable with the turbine; a gear assembly (102, 202, 302) that receives the input shaft (122, 222) at a first speed and drives an output shaft (124, 224) coupled to the fan assembly (104, 204) at a second speed, the second speed being slower than the first speed, the gear assembly (102, 202, 302) comprising a sun gear (304), a plurality of planet gear layshafts (330) that each support a first stage planet gear (306) and a second stage planet gear (308), and a ring gear (310), the sun gear rotating about a longitudinal centerline (120, 220, 320) of the gear assembly; and a lubrication system comprising a plurality of lubrication fluid supply lines (352), wherein the plurality of planet gear layshafts each comprise an interior passageway (331) that extends between an aft side of the layshaft and a fore side of the layshaft, and the plurality of lubrication fluid supply lines include one or more layshaft supply lines (353) that extend through respective ones of the interior passageways (331) of the planet gear layshafts (330).

2. The turbomachine engine of clause 1, further comprising one or more openings (361) along a length of the one or more layshaft supply lines (353) to direct fluid from within the layshaft supply lines to the interior passageway of the planet gear layshaft (330).

3. The turbomachine engine of any one of the preceding clauses, further comprising a planet carrier (328) that includes a plurality of lubrication channels (363) that receive one or more of the lubrication fluid supply lines (353).

4. The turbomachine engine of clause 3, wherein the planet carrier (328) comprise a fore portion and an aft portion, and both the fore and aft portions comprise one or more lubrication channels.

5. The turbomachine engine of clause 4, wherein the one or more lubrication fluid supply lines (353) that received in the plurality of lubrication channels (363) are in fluid communication with a first lubrication fluid distribution system (366) that directs lubrication fluid to a fore ring gear-mesh region and a second lubrication fluid distribution system (372) that directs lubrication fluid to a fore ring gear-mesh region.

6. The turbomachine of any one of the preceding clauses, further comprising a main lubrication fluid manifold in fluid communication with a third lubrication distribution system (362) at a sun gear-mesh region.

7. The turbomachine of any one of clauses 5 and 6, wherein one or more of the first lubrication system, the second lubrication system, and the third lubrication system comprise spraybars.

8. The turbomachine of any one of the preceding clauses, wherein the first stage planet gear (306) comprises a fore first stage planet gear and an aft first stage planet gear and further comprising one or more openings between the fore and aft first stage planet gears to scavenge oil from within the interior passageway (331) of the plurality of planet gear layshafts (330).

9. The turbomachine of any one of the preceding clauses, wherein the ring gear comprises a plurality of radial drain holes between an aft side and a fore side of the ring gear (310).

10. The turbomachine of any one of the preceding clauses, wherein the planet carrier comprises an axially extending portion that extends around at least a portion of the ring gear (310), wherein the axially extending portion comprises one or more gutters (390, 392) that direct lubrication fluid to a main collector area (387).

11. The turbomachine of clause 10, wherein the one or more gutters comprise a main gutter located at an axial center of the ring gear (310) and one or more axially-off gutters.

12. The turbomachine engine of any one of the preceding clauses, wherein the sun gear (304), the first stage and second stage planet gears (306, 308), and the ring gear (310) comprise double helical gears.

13. The turbomachine engine of any one of the proceeding clauses, wherein the ring gear (310) comprises a first ring gear set (324) that meshes with the third gear set (320) and a second ring gear set (326) that meshes with the fourth gear set (322).

14. The turbomachine of any one of the preceding clauses, wherein a gear ratio of the gear assembly ranges from 6:1 to 14:1, from 6.1 to 12:1, from 7:1 to 11:1, or from 8:1 to 10:1.

15. The turbomachine engine of any one of the proceeding clauses, wherein the fan assembly is a single stage of unducted fan blades.

16. The turbomachine engine of any one of the proceeding clauses, wherein the first stage planet gear has a first diameter and the second stage planet gear has a second diameter, wherein a ratio of the first diameter to the second diameter ranges from 1.0 to 2.0, 1.2 to 1.7, 1.3 to 1.6, or 1.4 to 1.5.

17. The turbomachine engine of any one of the proceeding clauses, wherein there are three planet gear layshafts (330).

18. A gear assembly for use with a turbomachine engine (100, 200) comprising a sun gear (304), a plurality of planet gear layshafts (330) that each support a first stage planet gear (306) and a second stage planet gear (308), and a ring gear (310), the sun gear rotating about a longitudinal centerline (120, 220, 320) of the gear assembly; a lubrication system comprising a plurality of lubrication fluid supply lines (352), wherein the plurality of planet gear layshafts each comprise an interior passageway (331) that extends between an aft side of the layshaft and a fore side of the layshaft, and the plurality of lubrication fluid supply lines include one or more layshaft supply lines (353) that extend through respective ones of the interior passageways (331) of the planet gear layshafts (330).

19. The gear assembly of clause 18, further comprising one or more openings (361) along a length of the one or more layshaft supply lines (353) to direct fluid from within the layshaft supply lines to the interior passageway of the planet gear layshaft (330).

20. The gear assembly of any one of claim 18 or 19, further comprising a planet carrier (328) that includes a plurality of lubrication channels (363) that receive one or more of the lubrication fluid supply lines (353).

21. The gear assembly of clause 20, wherein the planet carrier (328) comprise a fore portion and an aft portion, and both the fore and aft portions comprise one or more lubrication channels.

22. The gear assembly of any one or clauses 20 or 21, wherein the one or more lubrication fluid supply lines (353) that received in the plurality of lubrication channels (363) are in fluid communication with a first lubrication fluid distribution system (366) that directs lubrication fluid to a fore ring gear-mesh region and a second lubrication fluid distribution system (372) that directs lubrication fluid to a fore ring gear-mesh region.

23. The gear assembly of any one of clauses 18-22, further comprising a main lubrication fluid manifold in fluid communication with a third lubrication distribution system (362) at a sun gear-mesh region.

24. The gear assembly of any one of clauses 18-23, wherein the first stage planet gear (306) comprises a fore first stage planet gear and an aft first stage planet gear and further comprising one or more openings between the fore and aft first stage planet gears to scavenge oil from within the interior passageway (331) of the plurality of planet gear layshafts (330).

25. The gear assembly of any one of clauses 18-24, wherein the ring gear comprises a plurality of radial drain holes between an aft side and a fore side of the ring gear (310).

26. The gear assembly of any one of clauses 18-25, wherein the planet carrier comprises an axially extending portion that extends around at least a portion of the ring gear (310), wherein the axially extending portion comprises one or more gutters (390, 392) that direct lubrication fluid to a main collector area (387).

We claim:
1. A turbomachine engine comprising:
a fan assembly comprising a plurality of fan blades;
a core engine comprising a turbine and an input shaft rotatable with the turbine;
a gear assembly that receives the input shaft at a first speed and drives an output shaft coupled to the fan assembly at a second speed, the second speed being slower than the first speed, the gear assembly comprising a sun gear, a plurality of planet gear layshafts that each support a first stage planet gear and a second stage planet gear, and a ring gear, the sun gear rotating about a longitudinal centerline of the gear assembly, and the gear assembly having an aft side and a fore side; and
a lubrication system comprising a plurality of lubrication fluid supply lines, including at least a first lubrication supply line,
wherein the plurality of planet gear layshafts each comprise an interior passageway that extends between an aft side of the planet gear layshaft and a fore side of the layshaft, the first lubrication supply line extends along the aft side of the gear assembly, through the interior passageway of a respective one of the plurality of planet gear layshafts, and extends along the fore side of the gear assembly to a main lubrication fluid manifold, the main lubrication fluid manifold being in fluid communication with a first lubrication distribution system at a sun gear-mesh region, and the first lubrication supply line has one or more openings along a portion that extends through the interior passageway of the respective one of the plurality of planet gear layshafts to direct fluid from within the first lubrication supply line to the interior passageway of the planet gear layshaft.

2. The turbomachine engine of claim 1, further comprising a planet carrier that includes a plurality of lubrication channels that receive one or more of the lubrication fluid supply lines, and the first lubrication supply line further extends through a respective one of the plurality of lubrication channels.

3. The turbomachine engine of claim 2, wherein the planet carrier comprise a fore portion and an aft portion, and both the fore and aft portions comprise one or more lubrication channels.

4. The turbomachine engine of claim 3, wherein the first lubrication supply line is in fluid communication with a first second lubrication fluid distribution system, through one or more of the plurality of lubrication channels, to direct lubrication fluid to a fore ring gear-mesh region.

5. The turbomachine engine of claim 3, wherein the first lubrication supply line is in fluid communication with a third lubrication fluid distribution system, through one or more of the plurality of lubrication channels, to direct lubrication fluid to an aft ring gear-mesh region.

6. The turbomachine engine of claim 4, wherein at least one of the first lubrication system and the second lubrication system comprise spraybars.

7. The turbomachine engine of claim 2, wherein the planet carrier comprises an axially extending portion that extends around at least a portion of the ring gear, wherein the axially extending portion comprises one or more gutters that direct lubrication fluid to a main collector area.

8. The turbomachine engine of claim 7, wherein the one or more gutters comprise a main gutter located at an axial center of the ring gear and one or more axially-off gutters.

9. The turbomachine engine of claim 1, wherein the first stage planet gear comprises a fore first stage planet gear and an aft first stage planet gear and further comprising one or more openings between the fore and aft first stage planet gears to scavenge oil from within the interior passageway of the plurality of planet gear layshafts.

10. The turbomachine engine of claim 1, wherein the ring gear comprises a plurality of radial drain holes between an aft side and a fore side of the ring gear.

11. The turbomachine engine of claim 1, wherein the sun gear, the first stage and second stage planet gears, and the ring gear comprise double helical gears.

12. The turbomachine engine of claim 1, wherein the ring gear comprises a first ring gear set that meshes with a third gear set and a second ring gear set that meshes with a fourth gear set.

13. The turbomachine engine of claim 1, wherein a gear ratio of the gear assembly ranges from 6:1 to 14:1.

14. The turbomachine engine of claim 1, wherein the fan assembly is a single stage of unducted fan blades.

15. The turbomachine engine of claim 1, wherein the first stage planet gear has a first diameter and the second stage planet gear has a second diameter, wherein a ratio of the first diameter to the second diameter ranges from 1.0 to 2.0.

16. The turbomachine engine of claim 1, wherein there are three planet gear lay shafts.

17. A gear assembly for use with a turbomachine engine comprising:
a sun gear;
a plurality of planet gear layshafts that each support a first stage planet gear and a second stage planet gear;
a ring gear;
a lubrication system comprising a plurality of lubrication fluid supply lines; and
a first lubrication distribution system at a sun gear-mesh region;
wherein the sun gear rotates about a longitudinal centerline of the gear assembly,
wherein the plurality of planet gear layshafts each comprises an interior passageway that extends between an aft side of the layshaft and a fore side of the layshaft, and
wherein respective ones of the plurality of lubrication fluid supply lines extend through respective ones of the interior passageways of the planet gear layshafts, from an aft side of the gear assembly to a fore side of the gear assembly, to deliver a lubrication fluid to the first lubrication distribution system, the second lubrication system, and the third lubrication system.

18. The gear assembly of claim 17, further comprising one or more openings along a length of the respective ones of the plurality of lubrication fluid supply lines to direct fluid to the interior passageway of the planet gear layshaft.

19. The gear assembly of claim 17, further comprising:
a second lubrication distribution system at a fore ring gear-mesh region; and
a third lubrication distribution system at an aft ring gear-mesh region; and
a planet carrier that includes a plurality of lubrication channels that receive the respective ones of the plurality lubrication fluid supply lines to deliver the lubrication fluid between the first lubrication system and at least one of the second lubrication systems and third lubrication systems.

* * * * *